UNITED STATES PATENT OFFICE.

ARMAND MÜLLER JACOBS, OF MOSCOW, RUSSIA, ASSIGNOR TO ABRAHAM GARRISON BURTNETT, OF BRONXVILLE, NEW YORK.

TURKEY-RED MORDANT.

SPECIFICATION forming part of Letters Patent No. 243,378, dated June 28, 1881.

Application filed April 27, 1881. (No specimens.) Patented in Germany September 30, 1877.

*To all whom it may concern:*

Be it known that I, ARMAND MÜLLER JACOBS, of Moscow, Russia, have invented a new and useful Improvement in the Manufacture of Turkey-Red Mordant, of which the following is a specification.

This invention relates to new and useful improvements in the manufacture of turkey-red mordant.

In carrying out my invention the oils or fats, such as castor-oil, olive-oil, sunflower-seed oil, rape-seed oil, &c., are treated with sulphuric acid having a specific gravity of from 1.811 to 1.847, this acid being slowly added as a slender stream, so as to avoid a rapid increase of the temperature of the oil. The temperature of these oils rises very rapidly if they are treated with sulphuric acid, and this manipulation should therefore take place in an apparatus that can be conveniently cooled by means of ice, cold water, or cold air. I take about two hundred and twenty parts, by weight, of oils or fats, preferably such as are soluble in alcoholic solution, and a specific gravity from .8462 to .8367, and fifty parts of sulphuric acid. The oil or fat is poured into a wooden tank and the acid added gradually until (in about three hours) the temperature reaches 95° to 133° Fahrenheit. If the latter temperature is exceeded, the cooling apparatus is employed to bring it down to the desired point. The mixture then stands about twelve hours, the heat gradually decreasing. I then prepare a solution consisting of seventy-seven parts of common crystallized soda and four hundred and thirty-two parts of warm water, which is added gradually to the mixture of oil and sulphuric acid. The whole then stands twenty-four hours, when the oil is neutralized and may be taken off from the soda residuum in the tank. To the neutralized oil I add twenty-six parts of aqua-ammonia, in a small quantity at a time, when the mordant is ready for use, the whole process of preparation requiring about forty-eight hours.

Having thus fully described my invention, I claim as new and desire to secure by Letters Patent—

A process of preparing a mordant for use with alizarine in dyeing in turkey-red color, which consists, first, in uniting about two hundred and twenty parts of oil or fat and fifty parts of sulphuric acid, the mixture being stirred for about three hours until a temperature of 30° to 45° Reaumur is reached, and then left at rest for about twelve hours; secondly, adding to this mixture a watery solution of crystallized soda, and allowing the whole to stand about twenty-four hours; thirdly, drawing off the neutralized oil and adding about twenty-six parts of aqua-ammonia, as described.

The foregoing specification of my improvement in turkey-red mordant signed by me this 30th day of March, 1881.

ARMAND MÜLLER JACOBS.

Witnesses:
JEAN FISCHER,
CHARLES BLOESCH.